United States Patent

Huf

[11] 3,874,268
[45] Apr. 1, 1975

[54] DEVICE FOR GRINDING AND/OR MILLING WORKPIECES HAVING A TROCHOIDAL CROSS-SECTION

[75] Inventor: Franz Huf, Konstanz, Germany

[73] Assignee: Dornier System GmbH, Bodensee, Germany

[22] Filed: Sept. 19, 1973

[21] Appl. No.: 398,860

[30] Foreign Application Priority Data
Oct. 13, 1972 Germany............................ 2250172

[52] U.S. Cl..................... 90/20, 51/91, 51/DIG. 32
[51] Int. Cl............................ B23c 3/04, B24b 5/00
[58] Field of Search.......... 90/20, 11 R; 51/DIG. 32, 51/230, 91

[56] References Cited
UNITED STATES PATENTS
3,812,574   5/1974   Jones et al................... 51/DIG. 32

Primary Examiner—Gil Weidenfeld
Attorney, Agent, or Firm—James E. Bryan

[57] ABSTRACT

This invention relates to a device for grinding and/or milling a workpiece having a trochoidal cross-section comprising tool means having an axis of rotation in a stationary plane extending normally with respect to the cross-sectional profile, said workpiece being contacted by the tool means in a generatrix in a form-producing manner which, together with the axis of the tool means, constitutes a normal plane relative to the surface of the workpiece, first gear unit means for effecting positive rotation of the workpiece and for reproducing the trochoidal curve, follow-up gear unit means for guiding the workpiece into the relative position of the curve with respect to the normal plane, said follow-up gear unit means comprising rotatably mounted disc means displaceable together with bearing support means therefor in the direction of a diameter extending parallel to the normal plane, and whose center is offset with respect to the axis of rotation of the workpiece by n times the trochoid eccentricity, where $n$ corresponds to the ratio of the radii of the base circle to the rolling circle of the trochoidal shape, mounting means whereby said first gear unit is pivotal about a pivot axis parallel to the axis of rotation of the workpiece and extending through a simultaneous point of the trochoid, said pivot axis being positioned in the plane of displacement of the disc means, and drive shaft means coupling said follow-up gear unit means and said first gear unit means.

10 Claims, 6 Drawing Figures

DEVICE FOR GRINDING AND/OR MILLING WORKPIECES HAVING A TROCHOIDAL CROSS-SECTION

The present invention relates to a device for an exact form machining, such as grinding or milling, of workpieces having a trochoidal cross-section, or having a cross-section equidistant to a trochoid, as well as of the coordinated envelope curve. Workpieces with such cross-sections find use as rotors and counter-rotors in rotary piston engines, for example in internal combustion engines, compressors, and pumps.

The machining of trochoidal profile surfaces is presently performed by means of grinding devices, whereby a relative movement is effected between the tool and the workpiece, and the workpiece is driven at a uniform speed. The relative movement of the tool thus produces on the one hand, in a form-producing manner, the profile surface, and furthermore, from the point of view of processing techniques, the position of the tool with respect to the curve normal. In rotating tools, such as for example grinding discs, the axis of rotation of the tool must extend through the curve normal in order that the profile surface obtain a higher quality.

An adverse effect in the aforementioned machining devices is produced by the high structural cost as well as the generated gyroscopic forces which stem from the tools operating or rotating at high speed, for example a grinding wheel. These conditions, in the surface treatment or machining of trochoids for rotary piston engines, lead to varying and insufficient tolerance accuracies, as a result of which the operational efficiency of such engines is greatly reduced.

Known in the art are also methods for manufacturing workpieces with trochoidal shape which operate according to the copying principle. Required for this method is an extremely precise template whose accuracy, however, is very greatly diminished by errors of transmission onto the workpiece to be machined. The required accuracy in the machining of trochoids cannot be achieved with the known copying devices.

According to another known type of construction, machining devices are provided in which the workpiece is rotatably positioned on a movable work table and the generation of the profile shape is effected by means of shafts with gear wheels eccentrically positioned with respect to each other and rolling off on each other. In this case, the work table is brought into the position of the curve normal in the generating point of the trochoid in a form-producing manner relative to the grinding wheel or the like. Disadvantageous in this construction are the high structural cost of the machining device as well as the large masses of the work table to be accelerated with the workpiece. Furthermore, from the summation of the bearing plays there result inaccuracies due to which the accuracy of the trochoidal shape and the surface quality of the workpiece are reduced.

Moreover, the re-machining of a machine part into the curve normal, irrespective of whether the re-machining movement is carried out at the workpiece or at the tool, will result in considerable additional inaccuracies if, as has been customary heretofore, gear wheels are used in the re-machining elements. The reason therefor is that gear wheels have a line contact against each other at the tooth flanks. Between the lines of contact, however, there will appear the tooth gap and the flank play which, in trochoidal grinding machines, has its repercussion that no exact curve path will be ground, but rather the curve becomes slightly undulated. This means therefore that the chatter marks, which are so detrimental in rotary piston engines, are produced at the operating surface of the machine already during the manufacture thereof.

It is the object of the present invention to provide a device for grinding and milling trochoidal cross-sections with which it is possible to materially improve the attainable surface accuracy of known machining devices as well as to reduce the structural cost of such known machining devices.

This object is obtained, in accordance with the present invention, by virtue of the fact that a. the follow-up gear unit is composed of a rotatably-mounted disc which is displaceable together with its bearing support in the direction of a diameter extending parallel to the normal plane, and whose center is offset with respect to the axis of rotation of the workpiece by $n$ times the trochoid eccentricity, wherein $n$ corresponds to the ratio of the radii of the base circle to the rolling circle of the trochoidal shape, and b. the gear unit generating the trochoidal curve is pivotal about an axis which is parallel to the axis of rotation and extends through a simultaneous point of the trochoid, as well as coupled with the follow-up gear unit by the drive shaft, with the pivot axis being positioned in the shifting plane of the disc.

In one possible type of construction of the trochoid machining device, the drive shaft is offset by the degree of the trochoid eccentricity, and loosely arranged on the offset part thereof is a rolling-off gear wheel of the gear unit generating the trochoidal curve, while the workpiece is rigidly connected with the gear wheel and the disc is centrally mounted on an extension of the offset portion by $n$ times the trochoid eccentricity. In a second type of construction the workpiece is rigidly mounted on the drive shaft which is eccentrically positioned in the disc at the distance of $n$ times the trochoid eccentricity and rigidly connected with a movable structural part of the gear unit generating the trochoidal curve, while the disc is rigidly connected, at $(n + 1)$ times the trochoid eccentricity, with a rotatable body enclosing the drive shaft.

These proposed constructions of a trochoid machining device involve relatively simple structures wherein the bearing plays result — in view of the small number of bearings — in a high tolerance accuracy in the machining of trochoids. The rotating machining tool — apart from an adjusting movement — is spatially fixed in the direction to the workpiece. By virtue of this adjusting movement, the tool can machine a basic trochoid, the equidistant curves to the basic trochoid, outer and inner envelope curves to the basic trochoid, as well as equidistant curves to the envelope curves, so that it is possible to manufacture outer and inner curves with the same tolerance accuracy.

One embodiment of the trochoid machining device according to the present invention will be explained in further detail hereinafter on the basis of the accompanying drawings, wherein FIG. 1 schematically illustrates the principle of the trochoid machining device for a cardioid.

Figure 1:
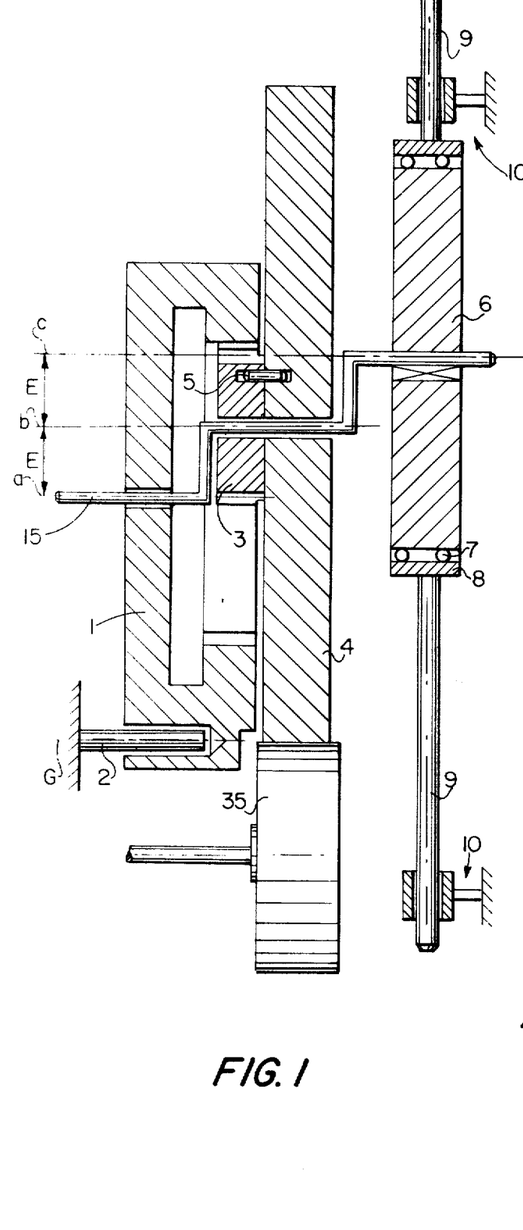

Shown in FIG. 1, in a greatly simplified fashion, for the embodiment of a heart-shaped curve (a cardioid) is a trochoid machining device with a gear wheel follow-up, in which the drive shaft 15 is uniformly driven via a homokinetic hinge (not shown herein). The drive shaft 15 is rotatably positioned within an internally toothed housing 1. This internally toothed housing 1 is pivotally mounted about an axis which extends through the simultaneous point and which is designated here as the simultaneous axis G. The simultaneous axis G is represented in the present FIG. 1 as a pivot 2 rigidly connected to the housing. The drive shaft 15 has a double offset portion in the same direction. Produced as a result are an eccentric with the center lines or axes a and b, and a further eccentric with the center lines or axes b and c. Eccentrically rotatably mounted on the axis b is the gear wheel 3 whose graduated circle radius corresponds to the eccentricity E. The internal toothing of the housing 1 has a graduated circle radius with the eccentricity 2×E. The gear wheel 3 is so mounted on the axis b that a rolling-off will take place in the internal toothing of the housing 1. The workpiece 4 to be machined is positioned on the axis b and is connected with the gear wheel 3 by means of a follower pin 5. Mounted on the axis c of the second offset portion of the drive shaft 15 and rigidly connected with the drive shaft 15 is a disc 6 which has, at the circumference thereof, a bearing 7 which is received in an annular bearing housing 8. The annular bearing housing 8 is guided within the crosshead guides 10, being mounted rigid with respect to the housing, by means of two mutually oppositely-positioned rods 9 arranged at the circumference. The tool 35 which is represented in FIG. 1 as a grinding disc, machines the workpiece 4 while tangent in the simultaneous axis G. The drive shaft 15 is driven via a homokinetic drive element 36 and thus put into a uniform rotary movement about the axis a. At the same time, the gear wheel 3 rolls off at the internal toothing of the housing 1 and imparts to the workpiece 4 connected with the gear wheel 3 a direction of rotation which is oppositely oriented with respect to the drive. The drive shaft 15 moves, during the rotary procedure, about the axis c and pivots the axis a about the axis of rotation of the simultaneous axis G.

The rotary movement of the drive shaft 15 produces an oscillating rectilinear movement of the disc 6 with the bearing 7, the bearing housing 8 and the rods 9 in the crosshead guides 10. At the same time, the housing 1 pivots about the pivot 2 of the simultaneous axis G and assures that the curve normal will always extend through the stationary axis of rotation of the tool 35.

By virtue of this construction, there results in the machining of trochoidal cross-sections, surfaces which have a high form accuracy, as well as a particularly exact surface quality. The form accuracy and surface quality of trochoidal cross-sections is, in turn, decisive for the operational efficiency of rotors and counter-rotors in rotary piston engines.

Figure 1A:
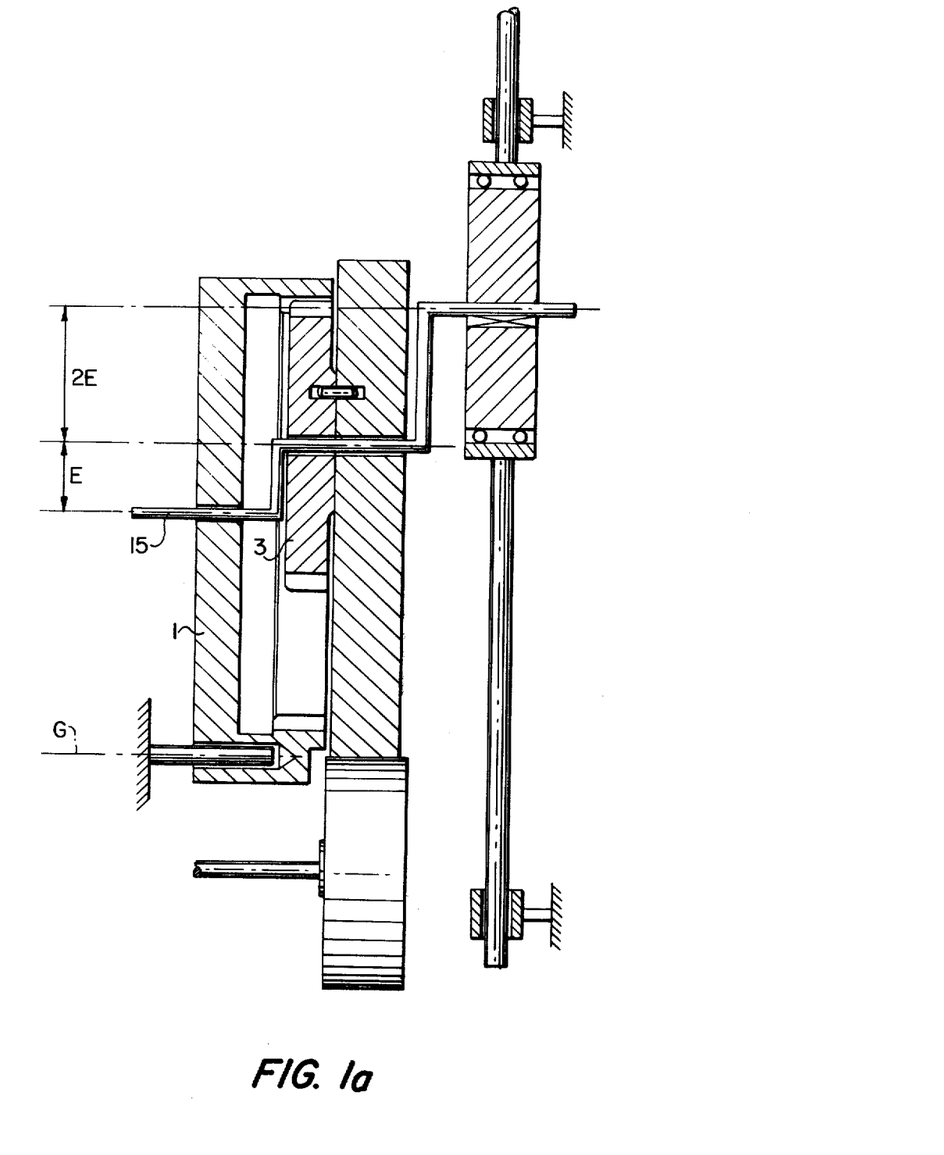
FIG. 1a is a modified construction of FIG. 1 for a kidney-shaped curve.

FIG. 1a illustrates a trochoid machining device, constructed according to the same principle as FIG. 1 but designed for a kidney-shaped curve (nephroid). The gear unit generating the trochoidal curve with the gear wheels 3 and 1 thereof has therefore a correspondingly different construction. The radii of the gear wheels behave here as 2 : 3. The drive shaft 15 is here again offset in one direction. As an indication for the first offset portion, according to the mathematical interrelationship of the trochoid generation, the trochoid eccentricity E is again selected. The second offset portion represents an extension of the first offset portion with an eccentricity of 2×E. The factor "2" appears here because, for the kidney-shaped curve, the ratio of radii of the base circle and the rolling circle running off thereon outwardly $r_1 : r_2 = n = 2$. This principle may be used for any trochoid shape in order to assure the required follow-up movement for the grinding operation.

Figure 2:
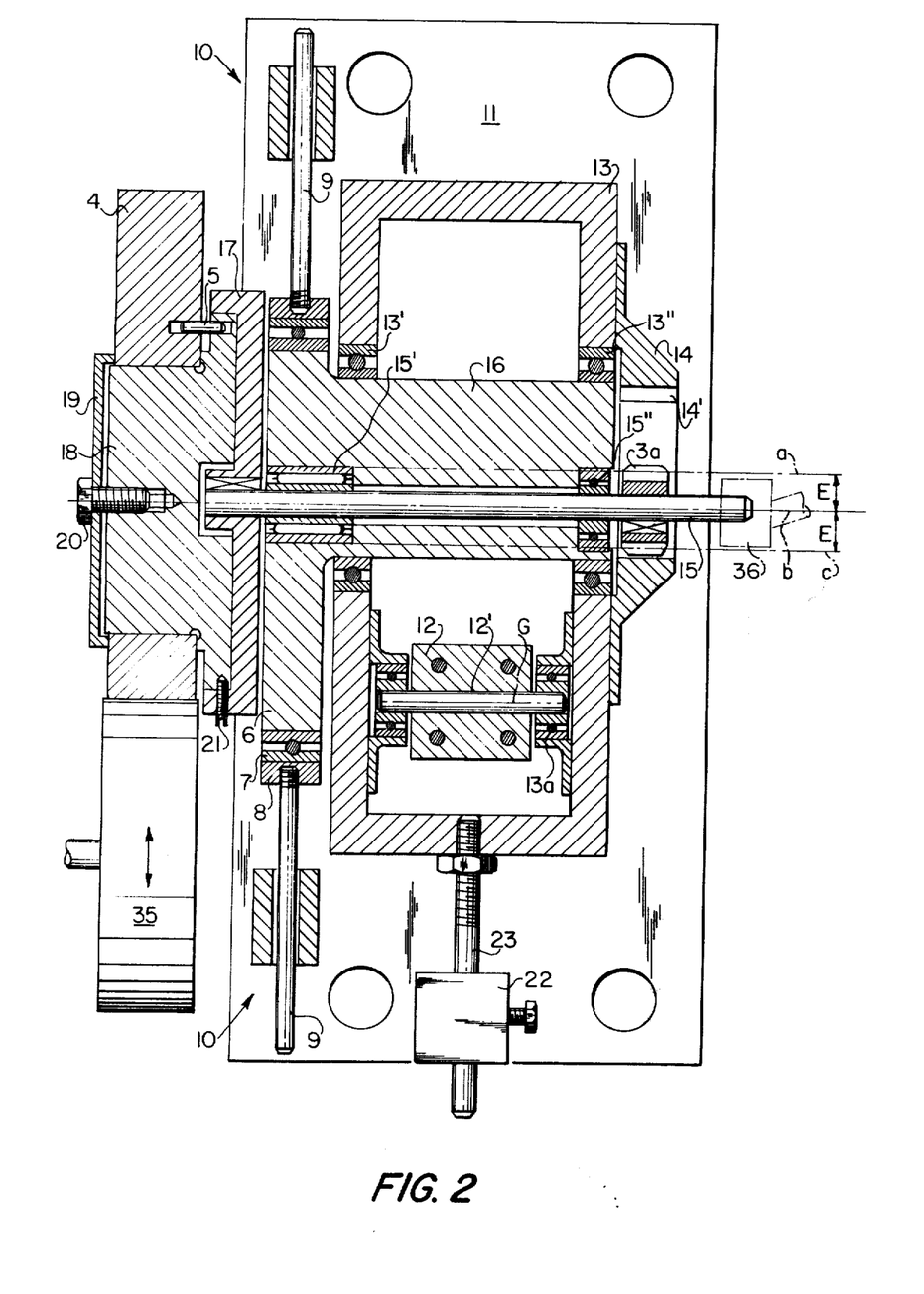
FIG. 2 illustrates a machining device in cross-section for a selected trochoid shape.

FIG. 2 illustrates one embodiment of the trochoid machining device proposed by the present invention in a cross-section thereof. Structural elements having the same action have been identified in the drawing with the same reference numerals. Rigidly connected with the base plate 11 are the crosshead guides 10, as well as the bearing block 12 at which the frame 13 is mounted so as to be pivotal about the simultaneous axis G. In this construction a gear unit together by means of gear wheels is equally provided, analogously to FIG. 1. The housing 14 having the internal toothing 14' is rigidly connected with the frame 13. In place of an offset drive shaft 15, a straight drive shaft is positioned, in this construction, within a rotatable body 16, and the function of the offset drive shaft is partially assumed by the rotatable body 16. Rotatably mounted in the rotatable body 16 about the axis b is the drive shaft 15 with the eccentricity E. Rigidly connected with the drive shaft 15 is the gear wheel 3a which is in meshing engagement with the internal toothing 14'. The rotatable body 16 is rotatably mounted within the frame 13 by means of the bearings 13' and 13''. The rotatable body 16 is moreover so constructed and arranged that a disc 6 mounted offset about the eccentricity E, with the axis c, is rotatably mounted within a bearing housing 8. Rigidly mounted at the bearing housing 8 are two mutually-oppositely positioned rods 9. These rods 9 are displaceably mounted in the crosshead guides 10. The drive is again effected by means of a homokinetic drive element 36, and positioned opposite thereto is the receiving device for the workpiece 4. This receiving device is composed in detail of a receiving plate 17 rigidly connected with the drive shaft 15 and in which the centering body 18 is received and secured in position by means of the stud bolts 21. The workpiece 4 is radially fixed on the circumference of the centering body 18 and axially clamped by the clampling plate 19 and the clamping bolt 20. In order to prevent any turning of the workpiece 4 with respect to the centering plate 18, a follower pin 5 is mounted between the centering plate 18 and the workpiece 4. The tool 35 is spatially stationary, except for an adjusting movement which may be executed as a feed.

The drive shaft 15 is put into a uniform rotary movement via a homokinetic drive element 36 by a drive means (not shown herein). At that time, the gear wheel 3a rolls over the internal toothing 14' of the housing 14 which is attached to the frame 13. The axis of the drive shaft 15 moves about the axis a of the rotatable body 16 with the radius of the eccentricity E and moves the rotatable body 16 positively in the rolling-off direction of the gear wheel 3a. The relative movement between the drive axle 15 and the rotatable body 16, as well as the concomitant rotation of the rotatable body 16 is effected via the bearings 15' and 15''. Simultaneously with the rotatable body rotation, the disc 6 also moves and describes with its axis $c$ a circle about the axis $a$ with the radius 2×E. The disc 6, which is mounted with the bearing 7 within the bearing housing 8 and guided by means of the rods 9 in the crosshead guides 10, pivots the frame 13 about the simultaneous axis G. This pivoting movement of the frame 13 is equally transmitted to the rotatable body 16 via the bearings 13' and 13'', and therewith to the drive shaft 15 which is again rotatably mounted. The pivotal bearing support of the frame 13 about the simultaneous axis G is composed of a shaft 12', the bearing means 13a secured to the frame, and the bearing block 12 secured to the base plate 11. The workpiece 4 mounted on the drive shaft 15 is continuously so pivoted that the curve normal thereof extends at all times through the stationary axis of rotation of the tool 35. This rectangular tangential provision in the curve normal between the workpiece 4 and the tool 35 produces the basis for an exact machining of the surfaces of trochoidal cross-sections.

In order to obtain a balancing of the masses of the frame 13 about the simultaneous axis G, an adjustable counter-balance weight 22 is mounted on the rod 23 rigidly secured to the frame.

The tool 35 is displaceable in the sense of an advance movement, as indicated by the arrows in FIG. 2. This renders it possible to machine outer and inner cross-sections, i.e., rotor and housing, on one machine. The direction of the advance movement of the machining tool 35 extends parallel to the direction of movement which is given by the crosshead guide 10, and hence by the simultaneous axis G. The exact theoretical trochoid is produced when the machining, i.e., the contact between the tool 35 and the workpiece 4, takes place in the extension of the simultaneous axis G. By displacing the tool 35 in the aforementioned direction it is readily possible to prepare curves equidistant with respect to the basic trochoid which have a precise tolerance accuracy with respect to each other. Rotor and counter-rotor may be manufactured in this manner solely upon an adjusting movement of the machining tool 35.

Figure 3:
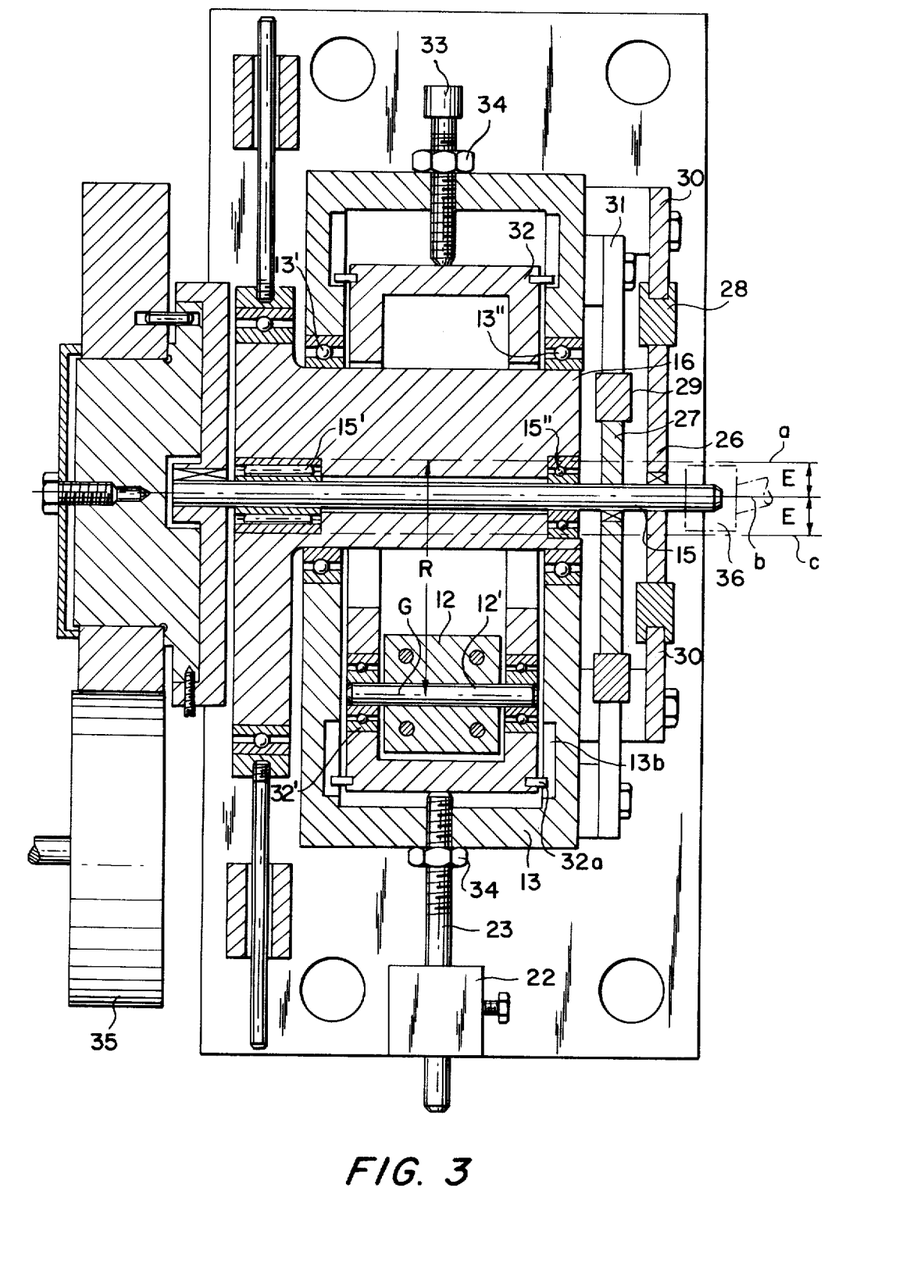
FIG. 3 illustrates a displaceable machining device in cross-section.

FIG. 3 illustrates a trochoid machining device which differs from the construction shown in FIG. 2 both by reason of a modified curve-producing gear unit and by reason of the displaceability thereof. The displaceability refers to the manufacture of geometrically similar trochoids, i.e., enlarged and reduced curves. As is well-known, the vertical distance of the simultaneous axis G relative to the central axis of the respective curve — designated in the present figure as axis a — produces the sum radius R, whereby R is — generally for epitrochoids — equal to the sum of the base circle radius and the rolling circle radius outwardly running off thereon. For hypotrochoids, R is equal to the difference of the base circle radius and the rolling circle radius. The axial distance of the rotatable body 16 from the simultaneous axis G, i.e., the axial distance between a and G, corresponds to the above-defined entity R. By displacing the frame 13 with respect to the frame 32, this distance is either reduced or enlarged, as may be necessary; yet the trochoid eccentricity remains unchanged. Thus it is possible by a suitable selection of R to bring about geometrically similar trochoid forms or shapes. Added thereto is the above-explained adjusting movement of the tool 35, whereby curves equidistant to any trochoid form or shape can be produced.

The curve-producing gear unit of the trochoid machining device is provided with crosshead guides by an eccentric gear unit known per se. The eccentric gear unit or system is composed specifically of eccentric discs 26 and 27 mounted in tandem and offset about 180°, which are rigidly connected with the drive shaft 15. The eccentric disc 26 and 27 are moreover rotatably positioned at the circumference thereof in the sliding plates 28 and 29. The sliding plates 28 and 29 are guided respectively in guide rails 30 and 31, and the direction of displacement is effected — rectangularly offset — in the sense of a system of coordinates in $x$ and $y$ coordinates. The guide bars 30 and 31 are rigidly connected with the frame 13. The drive shaft 15 is rotatably mounted in the bearings 15' and 15'' within the rotatable body 16. A second frame 32 is displaceably mounted within the frame 13 and is pivotally arranged, in the simultaneous axis G, at the bearing block 12, which is secured to the frame, by means of the shaft 12' as well as the bearings 32'. The displaceability of the frame 13 with respect to the frame 32 takes place by means of sliding pieces 32a which are guided within the sliding surfaces 13b. For the purpose of fixing the adjustable frame 32, a setscrew 33 with a counter nut 34, as well as a thread bolt 23 and a counter nut 34 are in each case mounted at the end face of the frames and clamped. This displaceability corresponds to the sum radius R, i.e., to the distance between the simultaneous axis G and the axis a. A counter-balancing weight 22 is displaceably mounted on the thread bolt 23 and serves for the balancing of masses during the pivoting movement of the frames 13 and 23 about the simultaneous axis G. The rotatable body 16 is positioned in the pivotal frame 13 by means of the bearings 13' and 13''. The remaining structure of the trochoid machining device corresponds to the embodiment shown in FIG. 2.

The drive shaft 15 is driven, for example, via a homokinetic hinge 36 which has been schematically shown in FIG. 3 in phantom. The trochoid-producing eccentric discs 26 and 27, which have in each case the trochoid eccentricity E, and with the eccentrics being offset about 180° with respect to each other, move in the inner surface of the sliding plates 28 and 29 and displace the same in two paths which have a rectangular position with regard to each other, in the direction of the slide bars 30 and 31. Produced as a result is the rotary movement — which is characteristic for trochoids — between the piston rotation and the oppositely-oriented eccentric rotation. The drive shaft 15 moves the rotatable body 16 with the radius of the eccentricity E positively about the central axis $a$. The further functional development of the machining device corresponds to the embodiment of FIG. 2.

The proposed trochoid-producing pair of eccentrics 26 and 27 — as compared to the known method — produces with the aid of gear wheels a more exact course of movement for the manufacture of trochoids and is suitable particularly for machining devices with which larger workpieces can be machined.

Figure 4:
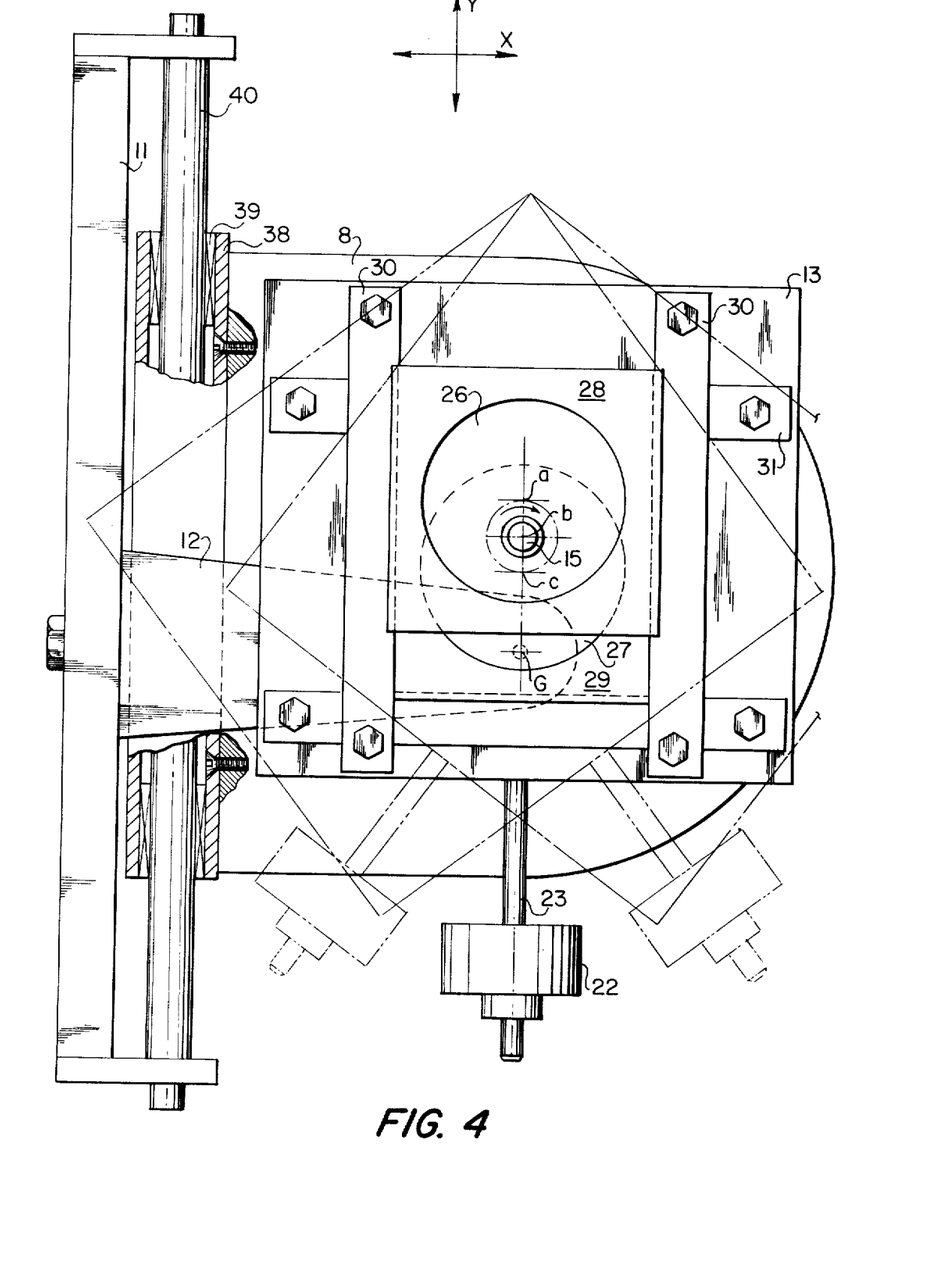
FIG. 4 is a side view of the trochoid machining device according to the present invention, and FIG. 4a schematically illustrates the manufacture of equidistant curves.

FIG. 4 shows a side view of the trochoid machining device, viewed in the direction of the drive shaft. In this case, the trochoid-producing eccentric gear unit or system, known per se, is shown with a mode of construction of a crosshead guide which is particularly favorable for the machining device. The eccentric gear system is composed of two eccentric discs 26 and 27 which, positioned in tandem, are rigidly connected with the drive shaft 15, and wherein the drive shaft is respectively offset about the trochoid eccentricity E beginning from the disc center in opposite directions. These eccentric discs 26 and 27 are each rotatably positioned in the sliding plates 28 and 29. The sliding plates 28 and 29 are longitudinally-displaceably located in the slide bars 30 and 31. The slide bars 30 are positioned at the pivot frame 13 in the y direction, and the slide bars 31 in the x direction and thus allow for a displaceability of the sliding plate 28 in the y direction, and of the sliding plate 29 in the x direction. During the rotation of the drive shaft 15, due to the displacement of the sliding plates 28 and 29, the curve-producing movement — also shown in FIG. 3 — is caused on the basis of the eccentric discs 26 and 27.

By the follow-up gear system 6 shown in FIGS. 2 and 3, the frame 13 is pivoted about the simultaneous axis G. The bearing block 12 which is fastened to the base plate 11 fixes the frame 13 so that the latter can execute only the pivoting movement about the simultaneous axis G. In order to compensate for the static imbalance of the frame 13, a rod 23 is provided for at the end face of the frame 13 on which the compensating weight 22 is displaceably mounted. The gear parts required for the pivoting movement are housed in the bearing housing 8 which in turn is rigidly connected with the sleeve 38 of the crosshead guide. The crosshead guide is composed of a solid guide rod 40 which is rigidly connected at both ends with the base plate 11 and which has an exact surface machining. The sleeve 38 is displaceably mounted by means of the bearing 39 on the guide rod 40. This construction or design of the cross-head guide is very precise and resistant to wear and tear. The frame 13 with the compensating weight 22 is illustrated in phantom in the two end positions of its pivoting position.

Figure 4A:
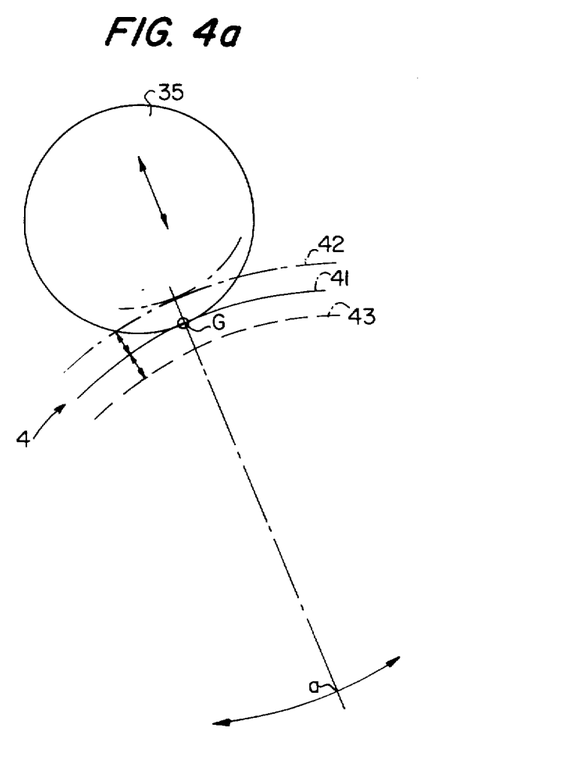

FIG. 4a schematically shows a view of the trochoid machining device. The tool 35 touches in a form-producing manner the curve of the workpiece 4 in the simultaneous axis G. By a corresponding continuous pivoting of the central axis a about the simultaneous axis G one achieves the effect that the line of contact between the tool 35 and the workpiece surface will at all times be positioned in the curve normal and in the basic trochoid 41 in the simultaneous axis G. By displacing the tool — as indicated by the direction of the arrow — equidistant trochoids can be made with the distance a, as has been shown in FIG. 4a with the curve paths 43 and 42 in a dashed and dash-dotted line respectively, relative to the curve path of the basic trochoid 41. The manufacture of precisely-defined equidistant trochoids has a decisive effect, in rotary machines with a rotor and counter-rotor, on the operational efficiency, service life, and smoothness of running.

By virtue of the follow-up gear system proposed herein which is very simple and is composed of only a few parts, the disadvantages of known grinding machines referred to hereinabove are largely eliminated. Due to the selection of a highly viscous lubricant for the bearings, which have not been specifically emphasized in the drawing for the sake of greater clarity of illustration, even the few possibly still remaining bearing plays can be eliminated to the greatest extent. Furthermore, the machining device is protected with dust and soil-preventing jackets. These means have not been illustrated in the drawings. Equally not shown therein is the possibility that several workpieces can be successively mounted on the drive shaft and simultaneously treated or machined. Conceivable as a further possibility is a tandem arrangement of two machining devices in which two mutually oppositely-positioned machining devices are driven in synchronism and operate in synchronism with each other. The mutually oppositely-disposed machining devices are connected with each other by a receiving shaft which receives one or several workpieces. By virtue of this arrangement, it is possible to machine several workpieces in one operating step, which is essential particularly for the economical mass production of workpieces having a trochoidal shape. In the interest of as great as possible a manufacturing accuracy, the bearing base for the pivot axis of the frame should, of course, be as large as possible, and moreover as much as possible it should be equal to the bearing base of the frame in the rotary body.

It will be obvious to those skilled in the art that many modifications may be made within the scope of the present invention without departing from the spirit thereof, and the invention includes all such modifications.

I claim:

1. A device for grinding and/or milling a workpiece having a trochoidal cross-section comprising tool means having an axis of rotation in a stationary plane extending normally with respect to the cross-sectional profile, said workpiece being contacted by the tool means in a generatrix in a form-producing manner which, together with the axis of the tool means, constitutes a normal plane relative to the surface of the workpiece, first gear unit means for effecting positive rotation of the workpiece and for reproducing the trochoidal curve, follow-up gear unit means for guiding the workpiece into the relative position of the curve with respect to the normal plane, said follow-up gear unit means comprising rotatably mounted disc means displaceable together with bearing support means therefor in the direction of a diameter extending parallel to the normal plane, and whose center is offset with respect to the axis of rotation of the workpiece by n times the trochoid eccentricity, where n corresponds to the ratio of the radii of the base circle to the rolling circle of the trochoidal shape, mounting means whereby said first gear unit means is pivotal about a pivot axis parallel to the axis of rotation of the workpiece and extending through a simultaneous point of the trochoid, said pivot axis being positioned in the plane of displacement of the disc means, and drive shaft means coupling said follow-up gear unit means and said first gear unit means.

2. A device according to claim 1 in which said drive shaft means is offset to the extent of the trochoid eccentricity, and including on said offset portion a rotatably-mounted rolling-off gear wheel means of said first gear unit means producing the trochoidal curve, and means connecting said workpiece with said rolling-off gear wheel means, said disc means being mounted on an extension of said offset portion to an extent of $n$ times the trochoid eccentricity.

3. A device according to claim 1 including means non-rotatably mounting said workpiece on said drive shaft means, the latter being eccentrically positioned in said disc means at a distance of $n$ times the trochoid eccentricity,
and
  means non-rotatably connecting said workpiece with a movable structural element of said first gear unit means,
  whereby said disc means is non-rotatably connected at $(n+1)$ times the trochoid eccentricity with rotatable body means enclosing said drive shaft means.

4. A device according to claim 1 including homokinetic drive means for the drive shaft means.

5. A device according to claim 1 including means connecting said first gear unit means with frame means, said frame means being pivotal about said pivot axis.

6. A device according to claim 5 including rotatable body means, enclosing said drive shaft means, rotatably mounted in said frame means.

7. A device according to claim 5 including means for counter-balancing said frame means, together with structural elements carried thereby, about said pivot axis.

8. A device according to claim 5 including means mounting said frame means between said first gear unit means and said follow-up gear unit means.

9. A device according to claim 5 in which said frame means comprises two frames in parallel,
  said frames being displaceable in parallel guide means from which one frame is pivotal about the pivot axis,
  and said other frame supporting structural elements of said gear unit means.

10. A device according to claim 1 including means whereby the axis of rotation of the tool means is adjustable in the normal plane corresponding to the distance of the parallel curve coordinated to a trochoid.

* * * * *